Patented May 26, 1942

2,284,284

UNITED STATES PATENT OFFICE 2,284,284

TREATMENT OF RUBBER

Louis H. Howland, Cheshire, Conn., assignor to United States Rubber Company, New York, N. Y., a corporation of New Jersey No Drawing. Application June 24, 1939, Serial No. 280,909

12 Claims. (Cl. 260—804)

This invention relates to treatment of rubber and more particularly to the use in rubber of improved age resister compositions.

The action of age-resisters like the action of vulcanization accelerators has been referred to as one of catalysis. Age-resisters may be classified according to whether their primary function is one of retarding the deterioration of rubber against the effects of light, heat or air, or against deterioration due to repeated strain of the rubber as illustrated by the repeated flexing action of rubber tires on the road. Some age-resisters satisfactorily fulfill one purpose but do not satisfactorily fulfill other purposes. Just as the action of some accelerators may be improved by the action of other accelerators, which has been referred to in the literature as the dual accelerator effect, so the action of some age-resisters may be improved by the action of other age-resisters to give an anti-aging value or anti flex-cracking value which is more than the additive effect of the two substances.

An object of this invention is to provide a composition having superior properties for retarding the deterioration of rubber. A further object is to provide an improved anti-flex-cracking agent and particularly one which satisfactorily fulfills the requirement for preventing the failure due to rapidly repeated strain of rubber, particularly rubber containing more than 30 parts of carbon black per 100 parts of rubber, e. g. tire tread stocks.

It has been found that if an aldehyde reaction product of the product of condensation of an aliphatic ketone and an arylamine is used as one component of the composition and an N,N'-disubstituted phenylene diamine is used as another component of the composition, the composition is far more active than either component and beyond the mere additive effect of the proportions of materials used, that is, the age-resisting characteristics of either of such components are markedly intensified in an unexpected manner by admixture of said components.

For the purposes of illustrating the best modes of the invention, a formaldehyde reaction product of an acetone-diphenylamine reaction product which may be produced as outlined in this application is selected for specifically showing the activating influence of N,N'-substituted phenylene diamines.

*Example I.*—A tire tread composition containing by weight, 100 parts of smoked sheet rubber, 45 parts of carbon black, 5 parts of zinc oxide, 3.50 parts of the zinc salt of cocoanut oil acids, 3.50 parts of pine tar, 3 parts of sulfur and 1 part of mercaptobenzothiazole were divided into two parts (stocks A and B). A has added to it one part of N, N'-diphenyl p-phenylene diamine per 100 parts of rubber; B has added to it, one part per 100 parts of rubber, of a mixture of 0.65 part of the formaldehyde derivative of acetone-diphenylamine reaction product with 0.35 part of N,N'-diphenyl p-phenylene diamine. These mixes were mold cured for 45, 60, 75, and 90 minutes at 30 pounds steam.

To a portion of a similar master batch made at a later date, was added in the ratio of 1.0 part per 100 parts of rubber a mixture of 0.65 part of the formaldehyde reaction product of acetone diphenylamine reaction product and 0.35 part of N,N'-diphenyl p-phenylene diamine (stock C) and to another portion of this master batch was added 1.0 part per 100 parts of rubber of a formaldehyde reaction product of an acetone-diphenylamine reaction product (stock D). These mixes were cured in a mold for 45, 60, 75 and 90 minutes at 30 pounds steam pressure.

Samples of the resulting stocks described above were flexed in a De Mattia flexing machine and the final comparative values are as follows:

| Stock | Value |
|---|---|
| A | 96.5 |
| B | 100 |
| C | 100 |
| D | 88 |

The acetone-diphenylamine condensation product may be prepared as described in United States Patent No. 1,906,935 or 2,026,386, and the condensation product then reacted with the formaldehyde.

In Example I above, the formaldehyde reaction product of the acetone-diphenylamine condensation product was prepared substantially as disclosed in U. S. Patent No. 2,026,386, provision being made for removing substantially all the unreacted diphenylamine after treatment with sodium and before reacting with formaldehyde as described in United States Patent No. 1,906,935.

*Example II.*—A tire tread composition containing by weight, 100 parts of smoked sheet, 45 parts of carbon black, 5 parts of zinc oxide, 1.25 parts of the zinc salt of cocoanut oil acids, 3.50 parts of pine tar, 3.25 parts of sulfur, 1.125 parts of hexamethylene tetramine and 0.375 part of diphenyl guanidine were divided into two parts (stocks E and F). Stock E had added to it one part of the formaldehyde derivative of an acetone-diphenylamine reaction product per 100 parts of rubber; stock F had added to it one part per 100 parts of rubber of a mixture of 0.65 part of the formaldehyde derivative of an acetone-diphenylamine reaction product with 0.35 part of N,N'-diphenyl-p-phenylene diamine. These mixes were mold cured for 30, 45, 60, 75 and 90 minutes at 45 pounds steam.

Samples of the resulting stocks described above were flexed in the DeMattia flexing machine and the final comparative values are as follows:

| Stock | Value |
|-------|-------|
| E | 81.5 |
| F | 100 |

The formaldehyde reaction product used in Example II was prepared substantially as described in U. S. Patent No. 1,906,935.

It will be apparent from the foregoing examples that the age-resisting characteristics of the aldehyde reaction product of the product of condensation of an aliphatic ketone with an arylamine are markedly intensified by the substitution for a portion of said product, of an N,N'-disubstituted phenylene diamine.

Other aldehyde derivatives of aliphatic ketone-arylamines may be used, more especially the multi-component product of reaction of an aliphatic ketone and a simple primary or secondary or primary-secondary aromatic amine, among the best known being the aldehyde derivative products of reaction resulting from condensing equimolecular or other proportions of either acetone, diacetone alcohol, mesityl oxide, phorone or ethyl methyl ketone with aniline, toluidine, naphthylamine phenetidine, p-amino diphenyl (p-xenylamine), or a diarylamine such as diphenylamine, phenyl - alpha - naphthylamine, phenyl-betanaphthylamine, phenyl tolylamine, ditolylamine, dinaphthylamine, tolyl naphthylamine, or p-amino diphenyl-amine, preferably in the presence of a reaction catalyst and either under refluxing conditions or at elevated temperatures in an autoclave, according to the already known practice in this art. The product of reaction of the ketone and the amine may be used as prepared for reaction with the aldehyde or it may be first freed of unreacted materials and/or it may first be treated with an alkali to remove acidity and improve its anti-aging properties.

Examples of other N,N'-disubstituted phenylene diamine compounds that may be used in the composition are phenyl tolyl p-phenylene diamine, tolyl naphthyl p-phenylene diamine, naphthyl phenyl p-phenylene diamine, naphthyl tolyl p-phenylene diamine, dinaphthyl-p-phenylene diamine, naphthyl benzyl p-phenylene diamine, dibenzyl p-phenylene diamine, and N-(p-tolyl)-N'-(p-toluene-sulphonyl)-p-phenylene diamine.

More than one of the aldehyde reaction products of ketone-amine reaction products variously referred to above may be used in the mix together with either one or more than one of the substituted phenylene diamines.

The components of the composition may be added to the rubber separately, but are preferably intimately mixed by fusion or blending before they are incorporated with the rubber.

The components may be used in various ratios other than those shown in the examples. Particularly good results are shown to be attainable when the amount of the aldehyde reaction product of the ketone-amine reaction product is at least equal to the amount of substituted phenylene diamine.

The invention may be applied to the preservation of natural rubber compositions as well as artificially prepared rubber compositions, including reclaimed rubbers, and latices of such rubber compositions.

The age-resister composition may be incorporated into the rubber by milling or similar process, or by mixing with the rubber latex before coagulation, or the application thereof may be made to the surface of the crude or vulcanized rubber. This application is a continuation in part of my co-pending application Serial No. 20,830, filed May 10, 1935, issued as U. S. Patent 2,183,567.

Rubber goods of various description may have their useful life prolonged by the practice of this invention, including tubes, hose, belting, packing, boots and shoes, surgical rubber goods, dipped rubber articles, etc. The invention, however, is particularly useful in connection with goods which like vehicle tires are subject to deterioration under the combined agencies of light, heat, air and repeated flexing strains.

Having thus described my invention what I claim and desire to protect by Letters Patent is:

1. A method of preserving rubber which comprises treating rubber with an aldehyde reaction product of an aliphatic ketone-arylamine condensation product, and in addition thereto an N,N'-diaryl phenylene diamine as an activator for said reaction product.

2. A method of preserving rubber which comprises treating rubber with an aldehyde reaction product of an acetone-diphenylamine condensation product, and in addition thereto an N,N'-diaryl phenylene diamine as an activator for said reaction product.

3. A method of preserving rubber which comprises treating rubber with an aldehyde reaction product of a metallic-sodium treated acetone-diphenylamine condensation product, and in addition thereto an N,N'-diaryl phenylene diamine as an activator for said reaction product.

4. A method of preserving rubber which comprises treating rubber with a formaldehyde reaction product of an aliphatic ketone-arylamine condensation product, and in addition thereto an N,N'-diaryl phenylene diamine as an activator for said reaction product.

5. A method of preserving rubber which comprises treating rubber with a formaldehyde reaction product of an acetone-diphenylamine condensation product, and in addition thereto an N,N'-diaryl phenylene diamine as an activator for said reaction product.

6. A method of preserving rubber which comprises treating rubber with a formaldehyde reaction product of an acetone-diphenylamine condensation product, and in addition thereto an N,N'-diphenyl para-phenylene diamine as an activator for said reaction product.

7. A vulcanized rubber product having improved resistance to repeated flexing strains which is the vulcanization product of a rubber composition comprising an aldehyde condensation product of an aliphatic ketone-arylamine reaction product and in addition thereto an N,N'-diaryl phenylene diamine as an activator for said reaction product.

8. A vulcanized rubber product having improved resistance to repeated flexing strains which is the vulcanization product of a rubber composition comprising an aldehyde reaction product of an acetone diphenylamine condensation product, and in addition thereto an N,N'-diaryl phenylene diamine as an activator for said reaction product.

9. A vulcanized rubber product having improved resistance to repeated flexing strains which is the vulcanization product of a rubber composition comprising a formaldehyde reaction product of an aliphatic ketone-arylamine condensation product and in addition thereto an N,N'-diaryl phenylene diamine as an activator for said reaction product.

10. A vulcanized rubber product having improved resistance to repeated flexing strains which is the vulcanization product of a rubber composition comprising a formaldehyde reaction product of an acetone-diphenylamine condensation product, and in addition thereto an N,N'-diaryl phenylene diamine as an activator for said reaction product.

11. A vulcanized rubber product having improved resistance to repeated flexing strains which is the vulcanization product of a rubber composition comprising a formaldehyde reaction product of an acetone-diphenylamine condensation product and in addition thereto an N,N'-diphenyl para-phenylene diamine as an activator for said reaction product.

12. A method of preserving rubber which comprises treating rubber with a formaldehyde reaction product of an acetone-diphenylamine condensation product, and in addition thereto an N,N'-diphenyl para phenylene diamine as an activator for said reaction product.

LOUIS H. HOWLAND.